(12) United States Patent
Khadjavi (10) Patent No.: US 12,093,762 B2
(45) Date of Patent: Sep. 17, 2024

(54) 3D-CODE

(71) Applicant: Armin Khadjavi, Baierbrunn (DE)

(72) Inventor: Armin Khadjavi, Baierbrunn (DE)

( * ) Notice: Subject to any disclaimer, the term of this patent is extended or adjusted under 35 U.S.C. 154(b) by 0 days.

(21) Appl. No.: 18/559,101

(22) PCT Filed: May 4, 2022

(86) PCT No.: PCT/EP2022/025206
§ 371 (c)(1),
(2) Date: Nov. 6, 2023

(87) PCT Pub. No.: WO2022/233458
PCT Pub. Date: Nov. 10, 2022

(65) Prior Publication Data
US 2024/0232561 A1    Jul. 11, 2024

(30) Foreign Application Priority Data

May 4, 2021    (DE) .................... 20 2021 001 643.0

(51) Int. Cl.
*G06K 19/06*    (2006.01)

(52) U.S. Cl.
CPC ... *G06K 19/06037* (2013.01); *G06K 19/0614* (2013.01)

(58) Field of Classification Search
None
See application file for complete search history.

(56) References Cited

FOREIGN PATENT DOCUMENTS

| DE | 102013101275 A1 | 8/2013 | |
|---|---|---|---|
| KR | 20180129174 A | 12/2018 | |
| WO | 0124106 A1 | 4/2001 | |
| WO | WO-2019214291 A1 * | 11/2019 | ....... G06K 19/06037 |
| WO | 2021001767 A1 | 1/2021 | |

\* cited by examiner

*Primary Examiner* — Kristy A Haupt
(74) *Attorney, Agent, or Firm* — Laurence A. Greenberg; Werner H. Stemer; Ralph E. Locher (57) ABSTRACT

The 3D-code is suitable for the visible wavelength range. The 3D-code includes a carrier and at least two overlapping QR codes lying one on top of the other. The fields of the first QR code and the fields of the second QR code are colored, transparent fields. The colors for the colored fields can be selected from at least two different colors. The first QR code has n×m fields. The second QR code has n×m fields, where $n \geq 1$ and $m \geq 2$.

12 Claims, 1 Drawing Sheet

3D-CODE

FIELD AND BACKGROUND OF THE INVENTION

It is about a 3D-Code which has a high information identity, the information identity having a color coding and/or an overlay of ID bar codes and/or 2D codes (2D matrix codes).

A high density of information must be provided on a small code carrier (substrate) that is forgery-proof and can be encrypted.

DESCRIPTION

The task is solved using a 3D-Code, which is a three-dimensional coding.

The 3D-Code has at least two 2D R-Codes.

1D means one-dimensional like a bar code.

2D means two-dimensional like a QR code or 2D matrix code.

3D means three-dimensional.

The term bar code is deliberately avoided here, because the English word "bar" means "linear" in German and is used as a term for linear or one-dimensional coding.

A QR code typically includes a variety of fields, usually black and white or colored fields.

QR codes are two-dimensional n×m matrix codes. For the matrix, "n" is the number of rows and "m" is the number of columns.

For the n×m matrix, $n \geq 1$ and $m \geq 2$.

An n×m matrix code with $n=1$ and $m \geq 2$ is a bar code.

An n×m matrix code with $n \geq 2$ and $m \geq 2$ is a QR code.

The QR codes for the 3D-Code application must have colored fields.

The 3D-Code can be used as a label or tag against piracy and for forgery-proof ID cards.

The advantages of the 3D-Code over QR code are:

The 3D-Code can be encoded, the 3D-Code only requires a small space, the 3D-Code has much more variation capacity than a QR code.

The 3D-Code also has the advantage that a high density of information can be achieved in a small space.

Example 1: For a code with only 3 fields and with 2 different available colors (similar to the binary code 0 and 1), the following variations are possible:

Bar code (3) with 3 lines fields≈10 linear example

QR code (9) with 9 fields≈500 area example

3D-Code (27) with 27 fields≈130 000 000 space example

The spatial example takes up 9 times more space than the linear example and offers 13,000,000 times more possible combinations.

The spatial example takes up 3 times more space than the area example and offers 260,000 times more combination options.

The possibilities of different colors have not yet been taken into account.

If the colors are also taken into account as in example 2, 7600 billion possible combinations can be created with a 3D-Code alone.

Example 2: for a 3D-Code with 27 fields and with 3 information variations 0/1/F these can be, for example, blank, color 1 and color 2: 7 600 000 000 000

The 9 fields in example 1 are to be understood as a QR code, which has 3×3=9 fields.

The 27 fields in examples 1 and 2 are to be understood as 3 QR codes, each of which has 3×3=9 fields and lies on top of each other on 3 layers.

The 2D codes or QR codes can be defined according to ISO/IEC 18004:2015.

A 2D code according to the prior art comprises a large number of fields arranged next to one another having or not having identifier. The identifier of a 2D code can be colored or gray. The absence of the identifier in the respective field is also information that is used to record the 2D code.

Some fields have identifiers and are otherwise free of identifiers.

A field free of identifier can be a blank field.

The use of different colors as identifiers for a 2D code increases the information density of the 2D code.

Another aspect is security against counterfeiting.

KR20180129174A describes a 3D-Code relevant to anti-counterfeiting security, which has three-dimensional bodies in one layer, but which does not contribute to increasing the information density. The manufacturing process is also complex.

SUMMARY OF THE INVENTION

The object of the present invention is to provide a forgery-proof code with a high information density that is easy to produce.

The inventive solution to the problem of further and easily increasing the information density with security against forgery is to provide a 3D-Code suitable for the visible wavelength range. A 3D-Code includes at least two QR codes with translucent, transparent, colored fields.

For this purpose, a large number of QR codes are stacked on top of each other in order to provide more information.

The 3D-Code has a substrate (carrier) and at least a first and a second QR code.

The QR codes are two-dimensional n×m matrix codes. For the matrix, "n" is the number of rows and "m" is the number of columns.

The carrier is essentially a flat substrate (carrier). This means that the carrier is flat.

Flat means that the thickness of the carrier is small compared to the circumference of the carrier, e.g. is 1/10. The flat carrier has a surface that is a reference surface. The surface of the carrier is oriented parallel to the XY plane in a Cartesian coordinate system.

The first QR code has n×m fields.

The second QR code 2 has n×m fields.

The second QR code is applied directly to the carrier.

The first QR code is then applied to the second QR code.

The fields of the first QR code cover the fields of the second QR code.

Thus, the fields of the first QR code together with the corresponding fields of the second QR code form stacks in the +Z direction of the Cartesian coordinate system.

The fields of the first QR code and the fields of the second QR code are colored, transparent fields. To select the colors for the colored fields, at least two different colors must be available (similar to the binary code 0 and 1).

The carrier is a transparent substrate. Since the fields of the at least two QR codes are also transparent, a light beam directed at the first QR code can pass through the second QR code and the carrier. A 3D-Code with a transparent carrier is a transmissive 3D-Code The substrate can be colorless or colored.

The substrate can be a plastic film or a transparent paper.

The light beam should be directed in the direction +Z, essentially perpendicular to the first QR code, so that deviation errors can be avoided. A deviation from the vertical light beam simulates a greater thickness of the colored fields. A deviation of 5° is tolerable.

The substrate may have a thickness of 0.01 to 1.0 mm and preferably 0.1 to 0.3 mm.

Instead of a substrate, the carrier of the 3D-Code can be a reflector with a reflective surface.

The reflective surface can be a paint application, a metallic foil or a mirror. The reflector can also be white paper.

The reflecting surface of the reflector faces the QR codes.

Since the fields of the at least two QR codes are transparent, a light beam directed at the first QR code can pass through the first and then through the second QR code.

However, this light beam reflects back at the reflector and first passes the second QR code and then the first QR code. The 3D-Code is a reflective 3D-Code.

A plurality of QR codes can be stacked on top of each other in an XYZ Cartesian coordinate system.

The QR codes are each oriented on planes parallel to the XY plane and overlap so that the fields of all QR codes overlap in the Z direction when stacked.

Covering the fields of the QR codes is not absolutely necessary, but covering the QR codes makes it possible to record the fields to determine stacks, e.g. the assignment of the fields of a first QR code to the fields of a second QR code is easier. A coverage error of around 10% based on the edge length of the identifiers acceptable because the overlapping core can still be scanned well. All QR codes stacked on top of each other must be recorded visually. The optically recorded information is stored in a database. There must be at least two different colors available, color 1 and color 2 (similar to the binary code 0 and 1) to determine the colors of the QR code fields.

Example 3: Here the colors of the fields of at least two QR codes lying on top of each other in any stack are considered.

The field in the first QR code is referred to here as F1 and the corresponding field in the second QR code is referred to as F2.

F1 and F2 can be assigned color1 or color2:

| F1 | F2 |
|---|---|
| Color1 | Color1 |
| Color1 | Color2 |
| Color2 | Color1 |
| Color2 | Color2 |

It is essential to store the color combinations of the adjacent fields in a database before the 3D-Code is produced, because these values will be used as a basis in the manufacturing process.

It must also be possible to determine which color is on which QR code simply by scanning; on the first QR code or on the second QR code.

If in one case it is Color1 for F1 and Color1 for F2, then it is possible to clearly determine on the basis of optical measurements that it is Color1+Color1.

This means that both F1 and F2 contain the Color1.

When a light with the initial intensity $I_0$ is irradiated only through F1 or F2 with Color1, less light is absorbed than if the light were to pass through F1+F2 with the Colo1, i.e. twice the Color1.

As already explained for the double occupancy of F1+F2 by Color1, a double occupancy of F1+F2 by Color2 can also be measured and recorded.

It is now important to assign and consider the assignment of F1+F2 using two different colors, Color1 and Color2.

Surprisingly, there will now be a difference whether the light ray $I_0$ passes through Color1+Color2 or through Color2+Color1.

The light beam intensity loss with the combination Color1+Color2 is different from Color2+Color1. The resulting color values for Color1+Color2 and Color2+Color1 are also different. These differences are particularly striking when the colors are bright.

For example, Color1 can be yellow and Color2 can be green.

A suitable yellow color according to the CIE standard color chart is: C:0 M:3 Y:44 K:5.

A suitable green color according to the CIE standard color chart is: C:23 M:0 Y:51 K:13.

In example 3 are the thickness of the colored fields and the color or colors are the same for all fields of the QR codes.

Example 4: In order to be able to determine and recognize the position of the first QR code based on the color of the field F1, the color can be specifically selected only for the fields of the first QR code and assigned to the first QR code.

Similarly, a Color2 can be selected for the F2 field on the second QR code.

A color P as a placeholder can appear on any QR code.

| F1 | F2 |
|---|---|
| Color1 | Color2 |
| Color-P | Color2 |
| Color1 | Color-P |
| Color-P | Color-P |

These combinations colors are always unique and can be recorded optically and stored in the database. For example, Color1 can be yellow, Color2 can be green, and Color-P can be red.

A suitable red color according to the CIE standard color table is: C:0 M:43 Y:39 K:2

In example 4, the thickness of the colored fields is always the same.

However, the color or colors are different for different QR codes.

Example 5: In order to be able to determine and recognize the position of the first QR code based on the color for F1, the Color1, Color2 can be used for both F1 and F2. However, the thickness of the colored fields of the first QR code can be distinguished from the thickness of the colored fields of the second QR code.

| F1 | F2 |
|---|---|
| Color2-D1 | Color2-D2 |
| Color1-D1 | Color2-D2 |
| Color2-D1 | Color1-D2 |
| Color1-D1 | Color1-D2 |

D1 and D2 each provide information about the different thicknesses of the colored fields. These color combinations are always unique and can be recorded optically and stored in the database. This means that the color or colors are the same on all layers. However, the thicknesses of the colored fields are different for different layers.

In example 5, the color or colors of the colored fields are always the same. However, the thicknesses of the colored fields are different for different QR codes.

The size and shape of the colored fields must also be defined.

The shape is usually rectangular or square. But round or oval shapes are also common.

The size of the area of a colored field can be 0.01 mm² to 100 mm² or more.

A sensible (meaningful) combination of Examples 3, 4 and 5 is possible.

Analogous to the description of the 3D-Code with two QR codes, a large number of QR codes can be used to form a 3D-Code. Also the number of colors for the colored fields can be more than two, Color-P, Color1, Color2, Color3, Color1-D1, Color1-D2, Color2-D1, Color2-D2, Color3-D1, Color3-D2. Here D1 and D2 stand for different thicknesses.

The color combinations as described above for a double color selection can also be recorded for multiple (more than double) color selection and saved in the database.

The colored fields must be transparent so that a beam of light can pass through them.

A black field of a QR code would not be suitable because the light beam is absorbed.

Translucent, gray or, even better, colored fields are suitable.

The QR code fields must always be colored so that the light beam from a light source can capture the color. The individual colors are recorded optically and stored in the database.

The resulting color, which is caused by the light beam passing through different colored fields, is also optically recorded using a commercially available CMOS sensor and/or a spectral analysis according to the state of the art and stored in the database.

CIE-LAB is used for color measurements and definition of the color values.

The color values are specified in the CMYK color model or converted to CMYK after the measurement data has been captured.

DIN 5033-4 can serve as a basis for the measurements.

For scanning to measure a stack, a light source sends a beam of light into the stack.

The transmitted light beam has an unweakened initial intensity $I_0$ and a wavelength $\lambda_0$.

The light is received by the scanner.

The weakening of the received light provides information about the color combination and/or the thickness of the fields in the stack. Further information can be taken from the color or wavelength of the received light in order to determine unique properties of the received light, i.e. a distinctive "fingerprint".

The light has a received, weakened light intensity I and a wavelength $\lambda$.

The absorbance E is measurable and can also be calculated theoretically.

Determination of Extinction:
 https://www.faes.de/MKA/MKA_Photometrieeinfuehrung/mka_photometrieeinfuehrung.html 20 10.2021

The extinction coefficient ε is a measure of the weakening (attenuation), extinction E, of electromagnetic waves through a medium, based on the path length d, through the medium and on the molar concentration c, of the substance in the solvent is applied.

The weakening occurs through scattering and absorption; if the proportion of scattering can be neglected, it is also referred to as the absorption coefficient.

The extinction E or optical density is the perceptually logarithmically formulated opacity and therefore a measure of the weakening of a radiation, for example light after passing through a medium.

It depends on the wavelength $\lambda$ of the radiation.
$I_0$=unweakened, initial intensity of the light
I=transmitted intensity of the light
T=transmission=$I_0$/I
ε=molar extinction coefficient
c=concentration
d=layer thickness
E=extinction=−log T=−log ($I_0$/I)=ε.c.d Theoretically, the absorbance value can be determined for each stack of a 3D-Code and thus the uniqueness of all possible combinations of stacks can be determined.

All values $I_0$, ε, c and d are known. The transmitted intensity of the light I can be calculated from these values.

$I_0$ is known by selecting the light.

ε can be taken from measurement data or from the literature.

c can be determined when selecting the color to be implemented.

d is the thickness of the field that can be measured.

A database of all compilations of all stacks can be used as the basis for an optical scan of a 3D-Code.

From this it can be seen which fields of the QR codes have which color on which QR code. The respective affiliations of the colors to the respective QR code are recorded in advance and stored in the database.

Detection of color properties: The wavelength can be determined using spectral analysis according to the state of the art. When the light is shined through a colored field, the light may be partially absorbed by the colored field. In order to avoid measurement errors in such recording methods, the color properties can be recorded in a dark box. Similarly, the scanning process can also be carried out in a dark box.

The recorded spectrum is specific and is referred to as the fingerprint of the affected colored field.

The color values of the reflected color can also be recorded using an optical measurement using a CMOS sensor according to the prior art.

CMOS=Complementary metal-oxide-semiconductor.

Now that all the variations or Combinations of the colored fields have been provided in the database for comparison, the production of the 3D-Code can be carried out using the information in the database.

The database contains organizational information and measurement data.

Organizational information regarding the structure of the 3D-Code is stored in the database.

The organizational information concerns:
 the serial number of the 3D-Codes,
 the personalization of the 3D-Codes; i.e., each 3D-Code in the current series is unique,
 information about the person or project and product, what the 3D-Code is planned for,
 the number of QR codes,
 the number of rows and columns of QR codes, which are established as required,
 the number of colors for the colored fields of the QR codes, which must be at least two,
 the thickness of the colored fields, which can be the same or different for all QR codes,
 the shape and size of the colored fields,
 whether the carrier is a reflector or a translucent substrate and, if applicable, the thickness of the substrate,
 the unweakened initial intensity of the light beam $I_0$, the color of the unweakened light beam,
the variation of the initial light intensity $I_0$ and the variation of the color of the light beam sent by the light source.

This organizational information is crucial for building the 3D-Codes during the manufacturing process.

The Measurement Data Concerns:

Optical properties of the individual, defined colors for the colored fields of the QR codes, these are the respective wavelengths recorded by spectral analysis of the specified colors and/or color values recorded by CMOS sensor, Intensity I of the light transmitted through the colored field depending on the initial intensity of the light beam $I_0$ or/and the color of the light, optical properties of all possible color combinations occurring in a stack of QR codes for the specified colors for the colored fields of the QR codes, these are the wavelength of the respective color combination recorded by spectral analysis of the specified colors and/or color values of the resulting light color of the respective color combination recorded by CMOS sensor, Intensity I of the light transmitted through the colored fields depending on the initial intensity of the light beam $I_0$ or/and the color of the light.

The optical properties of all possible color combinations occurring in a stack of QR codes also depend on the initial intensity and color of the light beam $I_0$. The color of the light beam $I_0$ is usually white and the initial intensity of the light beam can be constant.

Optionally, the initial intensity and/or the color of the light beam $I_0$ can be variable when measuring the optical properties.

The optical properties measured in this way are stored in the database.

During a later scanning process of the affected 3D-Codes, the same values for the variable light color and the variable initial intensity of the light beam $I_0$ are used to evaluate the relevant optical properties of the 3D-Code to be scanned using the information stored in the database.

Varying the light values of the light source increases the security of the 3D-Code because these two parameters can be used as random parameters.

The light source can be a lamp, for example be a diode or a halogen lamp with a predefined light quality.

The light from the lamp can be colorless or colored.

The lamp can be dimmed to achieve variable light intensity $I_0$.

Color filters or different colored lamps can be used for the variable light color.

When scanning the 3D-Code, these measurement data form an essential basis for assessing the authenticity of the 3D-Code.

A computer program is used to access the database and carry out the scanning process, which is implemented as a 3D-Code app in the scanner.

The scanner can be equipped with the 3D-Code app.

The 3D-Code app can also be implemented as a scanner for a smart phone.

To create the database, data regarding the nature of the QR code fields must be recorded or specified.

The number of QR codes, the number of rows and columns of the QR codes, and the geometric size and shape of the colored fields of the QR codes are determined as required.

At least two or more different colors must be specified for selection for colored fields.

All possible variations of colors and their combinations in a stack of 3D-Code must be optically recorded in advance.

That is, a light source sends a light beam with a predefined initial light intensity $I_0$ to the stack of 3D-Code to be captured.

The light source sends a beam of light with a predefined initial light intensity to the 3D-Code. The light beam can be a white or a colored light beam.

The variation of the initial light intensity $I_0$ as well as the color of the light beam emitted by the light source can be carried out according to a pre-planned scheme, which is predefined in the database. This increases the security of the scanning system that includes the 3D-Code, the light source and the scanner. The light passes through the layers of the 3D-Code and is reflected back to the scanner by means of the reflector.

The task is now to optically scan all the 2D codes stacked on top of each other and evaluate the result electronically in order to then evaluate the mentioned 3D-Code.

For the manufacturing processes mentioned above, color printing takes place using a digital printer. The digital printer is an inkjet printer or a laser printer.

The advantage of the inkjet printer is that the transparency of the colors can be achieved more easily. The advantage of the laser printer is that on the contact surface of a first color layer to the contact surface of a second color layer, the colors either do not diffuse into one another at all or only diffuse slightly.

The color layer can have a thickness of 0.001 to 0.1 mm and preferably 0.05 mm.

The layer thickness range contains 100 different thicknesses between 1 and 100 pm, each with a thickness increase of 1 pm. These are 1, 2, 3, 4, 5, 6 . . . 94, 95, 96, 97, 98, 99, 100 μm.

Preferably, the wavelength range 400 nm to 700 nm is selected for scanning the already mentioned 3D-Codes, which is a visible spectrum for the human eye and has the advantage that it can be viewed with the naked eye.

All wavelengths α-, ß- and γ-beam can be used for scanning.

When using α-radiation, ß-radiation and γ-radiation, plastics or metals can be used as a substrate. γ-radiation penetrates paper and aluminum, so aluminum foils can be used as a substrate.

Different aluminum alloys can be used as identifier for the fields on different substrates, each of which has different permeability to γ-radiation.

A scanner sends in an initial γ-beam and receives back a weakened, reflected γ-beam.

The captured 3D-Code can be read by machine and processed electronically.

Therefore, 3D-Codes can be cryptologically encrypted using known methods according to the state of the art.

The 3D-Code can be used for anti-counterfeit ID cards, ID cards, passports, driving licenses and bank cards.

The 3D-Code can be used against brand piracy in the textile industry, chip industry, pharmaceutical industry, industrial goods and vehicle construction.

BRIEF DESCRIPTION OF THE FIGURES

Exemplary embodiments of the 3D-Code are described using the following drawings.

There is shown.

DETAILED DESCRIPTION OF THE INVENTION

Figure 1A:
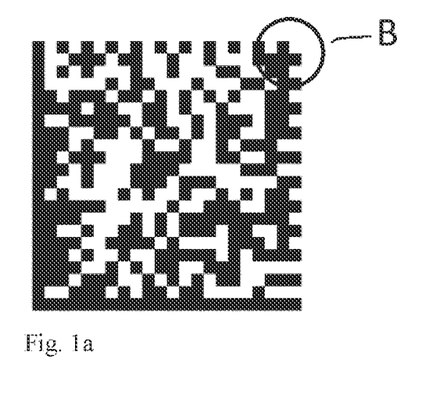
FIG. 1a shows a schematic top view of a 2D code according to the prior art https://commons.wikimedia.org/w/index.php?curidM812723, 2021-04-29, FIG. 1b detailed enlargement of a schematic top view of a 2D code.

FIG. 1a shows a schematic top view of a 2D code according to the prior art https://commons.wikimedia.org/w/index.php?curid=1812723, 2021-04-29

Figure 1B:
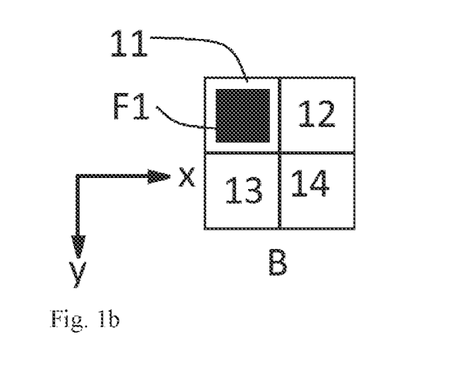

FIG. 1b shows a detailed enlargement B of the schematic top view of the 2D code.

Fields 11, 12, 13 and 14 of the 2D code are on an XY plane.

A colored identifier F1 is applied to field 11.

When fields 11, 12, 13 and 14 are optically scanned, the scanner detects that field 11 has a colored identifier F1 and the other fields have no identification marks.

The absence of the identifier in the respective field is also information that is used to record the 2D code.

The identifier F1 according to the prior art can be black or colored.

The use of different colors as identifiers for a 2D code increases the information density of the 2D code.

The solution to the problem according to the invention is to provide a forgery-proof code with a high information density that is easy to produce.

Figure 2A:
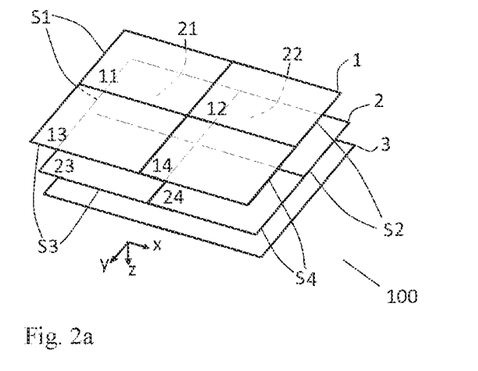
FIG. 2a is a perspective, schematic view of two translucent QR codes on a carrier.
Figure 2B:
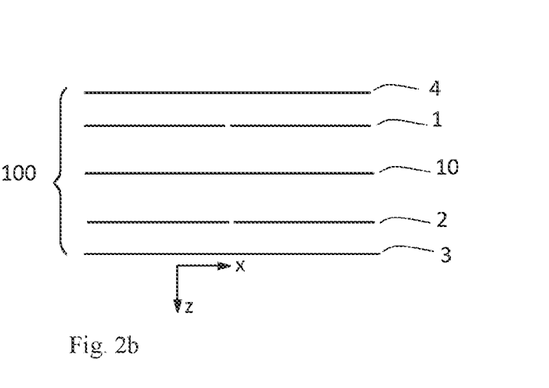
FIG. 2b is a schematic side view of two translucent QR codes on a carrier.

To produce the 3D-Code 100, at least two 2D codes are stacked on top of each other in order to provide more information (FIG. 2a, 2b).

The 3D-Code 100 is suitable for the visible wavelength range.

According to a first embodiment of the invention, the 3D-Code 100 comprises a carrier 3 and at least a first and a second QR code 1, 2 (FIG. 2a, 2b).

The QR codes 1, 2 are two-dimensional n×m matrix codes.

For the matrix, "n" is the number of rows and "m" is the number of columns.

The carrier 3 is essentially a flat carrier.

The flat carrier has a reference surface that is oriented parallel to the XY plane in a Cartesian coordinate system.

The first QR code 1 has n×m fields 11, 12, 13, 14.

The second QR code 2 has n×m fields 21, 22, 23, 24.

The second QR code 2 is applied directly to the carrier 30.

The first QR code 1 is then applied to the second QR code 2.

The fields 11, 12, 13, 14 of the first QR code 1 cover the fields 21, 22, 23, 24 of the second QR code 2.

The field 11 of the first QR code thus forms 1 together with the Field 21 of the second QR code 2 in the +Z direction of the Cartesian coordinate system a stack S1.

Analogously, field 12 forms a stack S2 with field 22.

The fields 11, 12, 13, 14 of the first QR code 1 and the fields 21, 22, 23, 24 of the second QR code 2 are colored, transparent fields. For selection of the colors for the colored fields, at least two different colors must be available.

For the n×m matrix, n>1 and m>2.

Figure 3A:
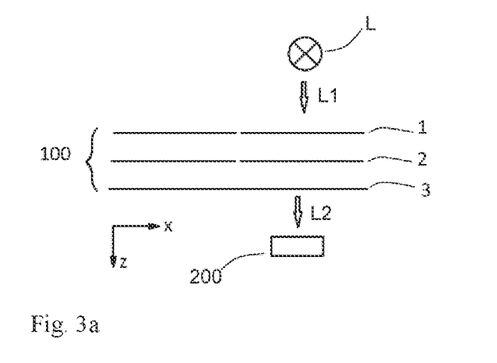
FIG. 3a shows a schematic side view of a translucent 3D-Code.

The carrier 3 is a transparent substrate.

Since the fields of the at least two QR codes 1, 2 are also transparent, a light beam directed at the first QR code 1 can pass through the second QR code 2 and the carrier 3.

Therefore, the 3D-Code 100 according to this embodiment is a transmissive 3D-Code (FIG. 3a).

The substrate can be colorless or colored.

The substrate may have a thickness of 0.01 to 1.0 mm and preferably 0.1 to 0.3 mm.

The color layer can have a thickness of 0.001 to 0.1 mm and preferably 0.05 mm.

The paint layer thickness range contains 100 different thicknesses between 1 and 100 pm, each with a thickness increase of 1 pm.

These are 1, 2, 3, 4, 5, 6 . . . 94, 95, 96, 97, 98, 99, 100 μm.

The colored plastic film can have a thickness of 0.1 to 1.0 mm and preferably 0.5 mm.

The layer thickness range includes thicknesses 0.1/0.2/0.3/0.4/0.5/0.6/0.7/0.8/0.9/1.0 mm.

Figure 3B:
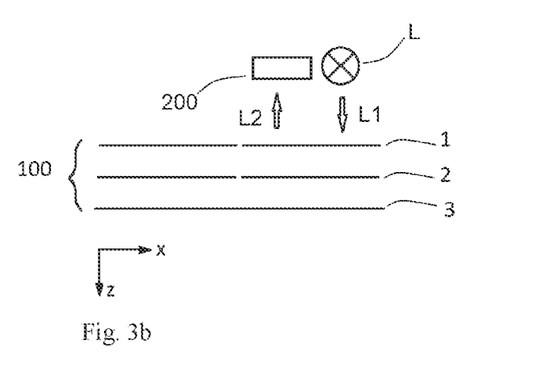
FIG. 3b is a schematic side view of a light-reflecting 3D-Code.

According to a second embodiment of the 3D-Code 100, the carrier 3 is a reflector with a reflecting surface. The reflecting surface of the reflector faces the QR code 2. Since the fields of the at least two QR codes 1, 2 are transparent, a light beam directed at the first QR code 1 can pass through the second QR code 2. However, the reflector reflects this beam of light back. The light beam first passes the second QR code 2 and then the first QR code 1. According to this embodiment, the 3D-Code 100 is a reflective 3D-Code (FIG. 3b).

The 3D-Code 100 may have a substrate 10 that is arranged between the first QR code 1 and the second QR code 2.

This means that each QR code 1, 2 is first applied to a substrate and then the substrates are placed on top of each other and joined together without air bubbles.

This can be helpful as an alternative to the 3D-Code 100 manufacturing process.

The substrate 10 may be a transparent, colorless or colored substrate.

The 3D-Code 100 can be surrounded, encased or protected by a protective layer 4.

The protective layer 4 can be a transparent, colorless or colored film.

The protective layer 4 can be a transparent, colorless or colored lacquer.

The protective layer 4 can have UV protection.

The protective layer 4 can protect the 3D-Code 100 against external influences.

The protective layer 4 as a film may have a thickness of 0.01 to 1.0 mm, and preferably 0.1 to 0.3 mm.

The protective layer 4 as a lacquer layer can have a thickness of 0.001 to 0.1 mm and preferably 0.05 mm. The paint layer thickness range contains 100 different thicknesses between 1 and 100 pm, each with a thickness increase of 1 pm.

These are 1, 2, 3, 4, 5, 6 . . . 94, 95, 96, 97, 98, 99, 100 μm.

The protective layer 4 as a plastic film can have a thickness of 0.1 to 1.0 mm and preferably 0.5 mm. The layer thickness range includes thicknesses 0.1/0.2/0.3/0.4/0.5/0.6/0.7/0.8/0.9/1.0 mm.

According to a further embodiment of the invention, the 3D-Code 100 is produced in a computer-implemented method.

The computer-implemented process includes the following steps:

Provision of a computer program that is based on an algorithm that controls the sequence of manufacturing steps based on predefined information stored in a database.

The information stored in the database is:

the number of 3D-Codes to be produced, the number of QR codes, the number of rows and columns of QR codes that are implemented in a 3D-Code, the number of colors for the colored ones Fields of the QR codes that are at least two different colors, the thickness of the colored fields that are the same or different for all QR codes, the size and shape of the colored fields, whether the carrier can be designed as a reflector or a translucent substrate and the thickness of the substrate, whether the colored fields of the QR codes are applied using a digital printer or using a 3D printer. 4

If colored fields of the QR codes are designed as color layers, then a digital printer must be provided to apply the color layers, which can be a laser printer or inkjet printer, which can also be used to apply varnishes.

If colored fields of the QR codes are designed as colored plastic films, then a 3D printer must be provided to apply the plastic films, which can be a commercially available plastic 3D printer. The application of plastic films can also take place using additive manufacturing known from the prior art. The manufacturing process of a 3D printer or additive manufacturing can be controlled electronically and can be used in a computer-implemented manufacturing process.

The colored plastic film can have a thickness of 0.1 to 1.0 mm and preferably 0.5 mm.

The layer thickness range includes thicknesses 0.1/0.2/0.3/0.4/0.5/0.6/0.7/0.8/0.9/1.0 mm.

Furthermore, a substantially flat carrier 3 must be provided, the reference surface of which is oriented parallel to the plane XY in a Cartesian coordinate system (FIG. 2*a*, 2*b*). n×m colored, transparent fields 21, 22, 23, 24 are applied to the carrier 3 in order to form a second QR code 2. Afterwards, further n×m colored, transparent fields 11, 12, 13, 14 are applied to the fields 21, 22, 23, 24 in order to form a first QR code 1.

Because first the second QR code 2 is applied to the carrier 3 and then the first QR code 1 is applied on top of the second QR code 2, when looking at a completed 3D-Code 100, only the first QR code 1 is seen. Basically, it is unimportant in which order the QR codes 24 are designated; what is important is that the order for the database and for the computer program used for the manufacturing process, an assignment of the QR codes is defined.

Stacks S1, S2, S3, S4 are formed in the +Z direction from the fields 11, 12, 13, 14 of the first QR code 1 and the fields 21, 22, 23, 24 of the second QR code 2 (FIG. 2*a*).

According to the information from the database, n>1 and m>2.

There are two alternatives for the design of the carrier 3 (FIG. 3*a*, 3*b*).

For the first alternative, the carrier is a transparent, colorless or colored substrate (FIG. 3*a*). For the second alternative, the carrier is a reflector with a reflective surface facing the QR code 2 (FIG. 3*b*). As already mentioned in other embodiments, a protective layer 4 can surround the 3D-Code 100 (FIG. 2*b*).

According to a further embodiment of the invention, a system for scanning the 3D-Code 100 is provided.

The system for scanning a 3D-Code 100 includes a 3D-Code 100, a light source L with a light intensity $I_0$ and a scanner 200 (FIGS. 3*a*, 3*b*).

There are two alternatives for executing the 3D-Code 100 because the carrier 3 of the 3D-Code 100 can be a translucent substrate or a reflector.

According to the first alternative, if the carrier 3 is a translucent, colorless or colored substrate, the predefined light beam sent from the light source L in the direction L1 passes through the 3D-Code 100 and is received as a received light beam in the direction L2 by the scanner 200. In this case, the light beam directions L1 and L2 are identical (FIG. 3*a*).

The light source L is positioned in front of the 3D-Code 100, which can send a light beam in the direction L1, essentially perpendicular to the first QR code 1.

Thus, the light beam passes through the stack S1, S2, S3, S4 and therefore after the light beam leaves the 3D-Code 100, its light intensity I is weakened.

FIG. 3 *a* shows that the 3D-Code 100 for the first alternative (carrier=translucent substrate) is positioned between the light source L and the scanner 200 and the scanner 200 faces the carrier 3 of the 3D-Code 100.

Now the weakened light beam with the light intensity I can be received by the scanner for evaluation.

If the carrier 3 is a reflector according to the second alternative, the predefined light beam sent from the light source L in the direction L1 reflects at the reflector and passes the QR codes 2 and 1 again in the direction L2.

Light beam directions L1 and L2 are opposite (FIG. 3*b*).

The reflector has a reflective surface that faces the QR code 2.

The scanner 200 faces the QR code 1 and is positioned next to the light source L.

The weakened, back-reflected light beam with the weakened light intensity I can be received by the scanner 200 for evaluation.

According to a further embodiment of the invention, a computer-implemented method for scanning the 3D-Code 100 is provided.

Computer-implemented scanning procedure includes the following steps:

Provision of a computer program that is based on an algorithm that controls the order of the scanning process based on predefined information stored in a database and validates the result of the scanning.

The information stored in the database is:

Optical properties of all possible color combinations occurring in a stack of QR codes for the specified colors for the colored fields of the QR codes.

Optical properties are the wavelength λ of the respective color combination of the specified colors as well as the color values of the resulting color of the respective color combination, and the intensity I of the light transmitted through the colored fields depending on the initial intensity of the light beam $I_0$ and the color of the light beam sent by the light source, and the color values of all possible color combinations occurring in a stack of QR codes for the specified colors of the colored fields of the QR codes, depending on the variation of the initial light intensity $I_0$ and the color of the light beam emitted by the light source.

Color combination here means taking into account all colors of the colored fields in a stack of QR codes, in the sense that when a ray of light passes through the stack, it contains the influence of all the colored fields that passed through as a ray of light emerging from the stack.

The optical property of the respective color combination therefore means the optical property of the emerging light beam that has passed through the colored fields of a stack of QR codes.

For the computer-implemented method for scanning the 3D-Code 100, a scanner 200 for scanning the 3D-Code 100 is provided.

The scanner 200 is designed to measure one or more light parameters.

The parameters are light intensity, light wavelength and light color values.

Furthermore, a light source L with a light intensity $I_0$ is provided.

A 3D-Code 100 is provided.

As described for one of the previous embodiments, there are two alternatives for the 3D-Code 100 because the carrier 3 of the 3D-Code 100 can be a translucent substrate or a reflector.

According to the first alternative (support 3=translucent substrate), the light beam sent from the light source L in the direction L1 passes the 3D-Code 100 and is received by the scanner 200 as a received light beam in the direction L2.

In this case, the light beam directions L1 and L2 are identical (FIG. 3a).

That is, the light beam hits the first QR code 1 essentially perpendicularly and passes through the stack S1, S2, S3, S4, which is why the light beam becomes weaker and has a weakened light intensity I.

The 3D-Code 100 is positioned between the light source L and the scanner 200.

The scanner 200 faces the carrier 3 of the 3D-Code 100 in order to receive the weakened light beam with the light intensity I and to evaluate it.

For evaluation, the scanner 200 compares the intensity I from the database with the light intensity I received during scanning and, if there is a match, verifies the authenticity of the 3D-Code 100, otherwise the 3D-Code 100 is declared invalid.

Alternatively or additionally, for evaluation, the scanner 200 can compare the relevant wavelength λ of the light from the database with the wavelength λ of the light received during scanning and, if there is a match, verify the authenticity of the 3D-Code 100, otherwise the 3D-Code 100 as declare invalid.

Alternatively or additionally, for evaluation, the scanner 200 can compare the relevant color values of the light from the database with the color values of the light received during scanning and, if there is a match, verify the authenticity of the 3D-Code 100, otherwise declare the 3D-Code 100 as invalid.

According to the second alternative (carrier 3=reflector), the light beam sent from the light source L in the direction L1 passes through the stack (S1, S2, S3, S4) and hits the reflector and reflects in the direction (L2). The reflected light beam becomes weaker and has a weakened light intensity (I).

The scanner 200 faces the QR code 1 and is positioned next to the light source L in order to evaluate the optical properties of the reflected light as described above.

A sensible combination of the different embodiments is possible.

LIST OF REFERENCE SYMBOLS

1 QR code 1
2 QR code 2
3 Substrate carrier
4 protective layer
10 Substrate 10
11-14 Fields 11 to 14 associated with QR code 1
21-24 Fields 21 to 24 associated with QR code 2
100 3D-Code
200 scanner
$I_0$ Light intensity of the light source L
I Light intensity of the weakened light beam
L light source
L1 Direction of the light beam emitted by the light source L
L2 Direction of the light beam received by the scanner 200
S1 Stack 1
S2 Stack 2
S3 Stack 3
S4 Stack 4
XYZ Cartesian coordinate system
XY XY plane of the Cartesian coordinate system
+Z Positive direction of the Z axis of the Cartesian coordinate system
$\lambda_0$ wavelength of the light source L
λ wavelength received by the scanner

The invention claimed is:

1. A 3D-Code for the visible wavelength range, the 3D-Code comprising:
   a flat carrier having a surface that is oriented parallel to an XY plane in a Cartesian coordinate system, said carrier being a transparent, colorless or a transparent, colored substrate;
   a plurality of QR codes, including at least a first QR code and a second QR code, disposed on said carrier;
   said QR codes being two-dimensional n×m matrix codes disposed on planes parallel to the XY plane in the Cartesian coordinate system, where n is a number of rows and m is a number of columns of a matrix;
   said second QR code having n×m fields applied directly to said carrier and said first QR code having n×m fields overlapping on the fields of said second QR code;
   wherein n≥1 and m≥2;
   said fields of said first QR code and said fields of said second QR code forming stacks in a direction +Z perpendicular to the XY plane in the Cartesian coordinate system;
   said fields of said QR codes being colored, transparent fields; and
   said fields being formed of at least two different colors.

2. The 3D-Code according to claim 1, further comprising a protective layer surrounding the 3D-Code.

3. A method of scanning a 3D-Code of claim 1, the method comprising:
   providing a 3D-Code according to claim 1;
   providing a computer program with an algorithm that controls an order of a scanning procedure based on predefined information stored in a database and validates a result of the scanning, the information including:
   a serial number of the 3D-Codes;
   optical properties of all possible color combinations occurring in a stack of QR codes for specified colors for colored fields of the QR codes;
   being a wavelength of the respective color combination of the specified colors or/and color value of the resulting color of the respective color combination, and an intensity of light transmitted through the colored fields depending on an initial intensity of the light beam and the color of the light;

optical properties of all possible color combinations occurring in the stack of the QR codes for the specified colors for the colored fields of the QR-Codes, depending on a variation of the initial light intensity as well as a color of the light beam sent by a light source;

providing a scanner for scanning the 3D-Code, the scanner being configured for at least one of a light intensity measurement, a light wavelength measurement, or a capturing of color values;

providing a light source with a predefined light intensity, and positioning the light source in front of the 3D-Code such that the light source can send a predefined light beam in a direction L1, perpendicular to the first QR code, such that the light beam passes through the stack;

wherein the light beam passing through the stack has a weakened light intensity;

wherein the 3D-Code is positioned between the light source and the scanner; and wherein the scanner faces the carrier of the 3D-Code in order to receive the light beam with the weakened light intensity from a direction L2 and to evaluate the light beam with the weakened light intensity;

the scanner evaluating scanning results by performing at least one of the following:

comparing the intensity from the database with the light intensity received during scanning and, if there is a match, verifying an authenticity of the 3D-Code, otherwise declaring the 3D-Code as invalid;

comparing the wavelength of the light from the database with a wavelength of the light received during scanning and, if there is a match, verifying the authenticity of the 3D-Code, otherwise declaring the 3D-Code as invalid;

comparing the color values of the light from the database with a color values of the light received during scanning and, if there is a match, verifying the authenticity of the 3D-Code, otherwise declaring the 3D-Code as invalid.

4. A system for scanning the 3D-Code of claim 1, the system comprising:

a computer program based on an algorithm configured to control an order of a scanning procedure based on predefined information stored in a database and to validate a result of the scanning, the information being:

a serial number of the 3D-Codes;

optical properties of all possible color combinations occurring in a stack of QR codes for the specified colors for the colored fields of the QR codes, being a wavelength of the respective color combination of the specified colors and/or a color value of a resulting color of the respective color combination;

a scanner for scanning the 3D-Code;

a light source with a predefined initial light intensity, a variable light color, and a variable light intensity;

said light source being positioned in front of the 3D-Code to enable said light source to emit a predefined light beam in a direction L1, perpendicular to the first QR code, and to cause the light beam to pass through the stack;

wherein the light beam passing through the stack has a weakened light intensity;

wherein the 3D-Code is positioned between said light source and said scanner;

wherein said scanner faces the carrier of the 3D-Code and the light beam with the weakened light intensity is received by the scanner for evaluation of the optical properties of the light beam.

5. A 3D-Code for the visible wavelength range, the 3D-Code comprising:

a flat carrier having a surface that is oriented parallel to an XY plane in a Cartesian coordinate system;

a plurality of QR codes, including at least a first QR code and a second QR code;

said QR codes being two-dimensional n×m matrix codes on planes parallel to the XY plane in the Cartesian coordinate system, where n is a number of rows and m is a number of columns of a matrix;

said second QR code having n×m fields applied directly to said carrier and said first QR code having n×m fields overlapping on the fields of said second QR code;

wherein n≥1 and m≥2;

said fields of said first QR code and said fields of said second QR code forming stacks in a direction +Z perpendicular to the XY plane in the Cartesian coordinate system;

said fields of said QR codes being colored, transparent fields, and said fields having at least two different colors; and said carrier being a reflector with a reflecting surface, and said reflecting surface facing said second QR code.

6. The 3D-Code according to claim 5, further comprising a protective layer surrounding the 3D-Code.

7. A method of scanning the 3D-Code of claim 5, the method comprising:

providing a 3D-Code according to claim 5;

providing a computer program with an algorithm that controls an order of a scanning procedure based on predefined information stored in a database and validates a result of the scanning, the information including:

a serial number of the 3D-Codes;

optical properties of all possible color combinations occurring in a stack of QR codes for specified colors for the colored fields of the QR codes;

being a wavelength of a respective color combination of the specified colors and/or a color value of a resulting color of the respective color combination;

an intensity of the light transmitted through the colored fields depending on an initial intensity of the light beam and the color of the light;

optical properties of all possible color combinations occurring in the stack of QR codes for the specified colors for the colored fields of the QR codes, depending on a variation of an initial light intensity and a color of a light beam emitted by a light source;

providing a scanner for scanning the 3D-Code, the scanner being configured for at least one of a light intensity measurement, a light wavelength measurement, or a capturing of color values;

providing a light source with a predefined initial light intensity;

placing the light source in front of the 3D-Code in such a way that the light source can send a predefined light beam in a direction L1, perpendicular to the first QR code;

passing a light beam of the light source through the stack, wherein the light beam, after passing through the stack, has a weakened light intensity;

reflecting the light beam back at the reflector of carrier, in a direction L2;

the scanner facing the QR code and being positioned next to the light source in order to receive the light beam with the weakened light intensity and to evaluate the light beam;

performing an evaluation with the scanner by at least one of the following:

comparing the intensity from the database with the light intensity received during scanning and, if there is a match, verifying the authenticity of the 3D-Code, otherwise declaring the 3D-Code as invalid;

comparing the wavelength of the light from the database with the wavelength of the light received during scanning and, if there is a match, verifying the authenticity of the 3D-Code, otherwise declaring the 3D-Code as invalid;

comparing the color values of the light from the database with the light color properties of the light received during scanning and, if there is a match, verifying the authenticity of the 3D-Code, otherwise declaring the 3D-Code as invalid.

8. A system for scanning the 3D-Code of claim 5, the system comprising:

a computer program based on an algorithm configured to control an order of the scanning procedure based on predefined information stored in a database and validates the result of the scanning, the information including:

serial number of the 3D-Codes;

optical properties of all possible color combinations occurring in a stack of QR codes for the specified colors for the colored fields of the QR codes, being a wavelength of a respective color combination of the specified colors and/or a color value of the resulting color of the respective color combination;

a scanner for scanning the 3D-Code;

a light source having a predefined initial light intensity, and wherein a light color and/or the light intensity of said light source are variable;

said light source being positioned in front of the 3D-Code to enable said light source to emit a predefined light beam in direction L1, perpendicular to the first QR code, and to cause the light beam to pass through the stack;

wherein the light beam passing through the stack has a weakened light intensity;

wherein the 3D-Code is positioned between the light source and the scanner;

wherein the light beam is reflected back at the reflector in a direction L2; and wherein the scanner faces the QR code and is positioned next to the light source and wherein the reflected light beam with the weakened light intensity is received by the scanner to evaluate the optical properties of the light beam.

9. A method of producing a 3D-Code, the method comprising the following steps:

providing a computer program based on an algorithm that is configured to control a sequence of manufacturing steps based on predefined information stored in a database, the predefined information being:

a serial number of the 3D-Code;

a personalization of the 3D-Codes to ensure the uniqueness of each 3D-Code;

a number of 3D-Codes to be produced;

a number of QR codes and a number of rows and columns of the QR codes to be implemented in a 3D-Code;

a number of colors for colored fields of the QR codes, with the colors being at least two different colors;

a thickness of the colored fields that are the same or different for all QR codes;

a size and a shape of the colored fields;

whether a carrier for the QR codes is a reflector or a translucent substrate, and a thickness of the substrate;

whether the colored fields of the QR codes are to be applied using a digital printer or using a 3D printer;

providing a digital printer or a 3D printer;

providing a flat carrier having a surface that is oriented parallel to an XY plane in a Cartesian coordinate system;

applying n×m colored, transparent fields to the carrier to form a second QR code;

applying further n×m colored, transparent fields on the transparent fields of the second QR code to form a first QR code;

wherein the fields of the first QR code and the fields of the second QR code form stacks in a direction +Z perpendicular to the XY plane;

wherein according to the information from the database $n \geq 1$ and $m \geq 2$; and wherein:

the carrier is a transparent, colorless or a transparent colored substrate;

or the carrier is a reflector with a reflecting surface, and the reflecting surface of the reflector faces the second QR code.

10. The method according to claim 9, which comprises applying the n×m colored, transparent fields with a digital printer being an inkjet color printer or a laser color printer.

11. The method according to claim 9, which comprises applying the n×m colored, transparent fields with a 3D printer being a plastic 3D printer.

12. The method according to claim 9, which comprises applying a protective layer to the 3D-Code.

* * * * *